(12) United States Patent
Kouznetsov et al.

(10) Patent No.: US 7,389,349 B2
(45) Date of Patent: Jun. 17, 2008

(54) ELECTRONIC MESSAGING SYSTEM FOR ADJUSTING COMPUTER POLLING PERIOD BASED ON USER'S PREDICTED MESSAGING ACTIVITY

(75) Inventors: Alexander Kouznetsov, Katy, TX (US); Gary Brasher, Montgomery, TX (US)

(73) Assignee: SimDesk Technologies, Inc., Houston, TX (US)

( * ) Notice: Subject to any disclaimer, the term of this patent is extended or adjusted under 35 U.S.C. 154(b) by 190 days.

(21) Appl. No.: 11/270,688

(22) Filed: Nov. 9, 2005

(65) Prior Publication Data
US 2006/0059239 A1 Mar. 16, 2006

Related U.S. Application Data

(62) Division of application No. 10/746,110, filed on Dec. 24, 2003, now abandoned.

(60) Provisional application No. 60/436,235, filed on Dec. 24, 2002.

(51) Int. Cl.
*G06F 15/173* (2006.01)
(52) U.S. Cl. .................. 709/224; 709/229; 709/219

(58) Field of Classification Search ................ 709/217, 709/218, 219, 224, 229; 713/201; 710/15, 710/46; 702/186; 370/346
See application file for complete search history.

(56) References Cited

U.S. PATENT DOCUMENTS

| | | | |
|---|---|---|---|
| 6,301,609 B1 | 10/2001 | Aravamudan et al. |
| 6,308,214 B1 | 10/2001 | Plevyak et al. |
| 6,430,602 B1 | 8/2002 | Kay et al. |
| 6,430,604 B1 | 8/2002 | Ogle et al. |
| 6,449,344 B1 | 9/2002 | Goldfinger et al. |
| 6,449,663 B1 | 9/2002 | Carney et al. |
| 6,615,161 B1 | 9/2003 | Carney et al. |
| 6,640,268 B1 | 10/2003 | Kumar |
| 6,657,987 B1 | 12/2003 | Kumar et al. |
| 2002/0026483 A1 | 2/2002 | Isaacs et al. |
| 2002/0034281 A1 | 3/2002 | Isaacs et al. |
| 2002/0083136 A1 | 6/2002 | Whitten, II |
| 2002/0130904 A1 | 9/2002 | Becker et al. |
| 2003/0046587 A1 | 3/2003 | Bheemarsetti et al. |

*Primary Examiner*—Le Luu
(74) *Attorney, Agent, or Firm*—Wong, Cabello, Lutsch, Rutherford, & Brucculeri, L.L.P.

(57) ABSTRACT

A messaging system is disclosed that provides dynamic polling of a message server for use in a stateless communication system. The polling interval may be determined by a user, or it may be determined based on current message activity or on statistics derived from historical message activity. Application-to-application, as well as human-to-human, messaging capability is also disclosed.

21 Claims, 1 Drawing Sheet

ELECTRONIC MESSAGING SYSTEM FOR ADJUSTING COMPUTER POLLING PERIOD BASED ON USER'S PREDICTED MESSAGING ACTIVITY

CROSS REFERENCE TO RELATED APPLICATIONS

The present application is a divisional patent application of U.S. application Ser. No. 10/746,110, filed Dec. 24, 2003 now abandoned, entitled "INTERNET-BASED MESSAGING SYSTEM," which is hereby incorporated by reference in its entirety.

The present application claims priority from U.S. Provisional Application Ser. No. 60/436,235, filed Dec. 24, 2002, entitled "INSTANT MESSAGING METHODOLOGY," which is hereby incorporated by reference in its entirety.

BACKGROUND OF THE INVENTION

The present invention relates to internet-based communications systems and, more particularly, to a central server messaging system that provides efficient use of server resources.

Computer-based messaging via the internet, and in particular instant messaging systems, are becoming a popular communication tool that are used by individuals and businesses alike as an effective means to transfer and relay information to other individuals, between co-workers, and to or from customers. Instant messaging systems typically operate through the use of a central server, which routes messages to the proper recipient. This activity, however, consumes server resources which would otherwise be available for other applications. As it is often not economically feasible to implement a server exclusively committed to managing instant messages, the central server must share its resources with the instant messaging system as well as any other applications that are provided. It is important, therefore, to manage server resources carefully in order to permit efficient and responsive operation of the server in the use of any application, including instant messaging.

SUMMARY OF THE INVENTION

It is therefore an object of the present invention to provide an internet-based messaging system that permits users to intelligently poll the server for messages based on particular criteria.

It is a further object of the present invention to provide an internet-based messaging system that permits users to establish a message polling schedule to enable the timed-delivery of message to one or more selected computers or communications devices.

It is yet a further object of the present invention to provide an internet-based messaging system that establishes a message polling schedule based on historical message activity.

It is still a further object of the present invention to provide an internet-based messaging system that performs modifications of an established message polling schedule in response to actions by users.

These and other objects will become apparent from the illustrated drawing and the description of the embodiments.

DESCRIPTION OF THE EMBODIMENTS

Figure 1:
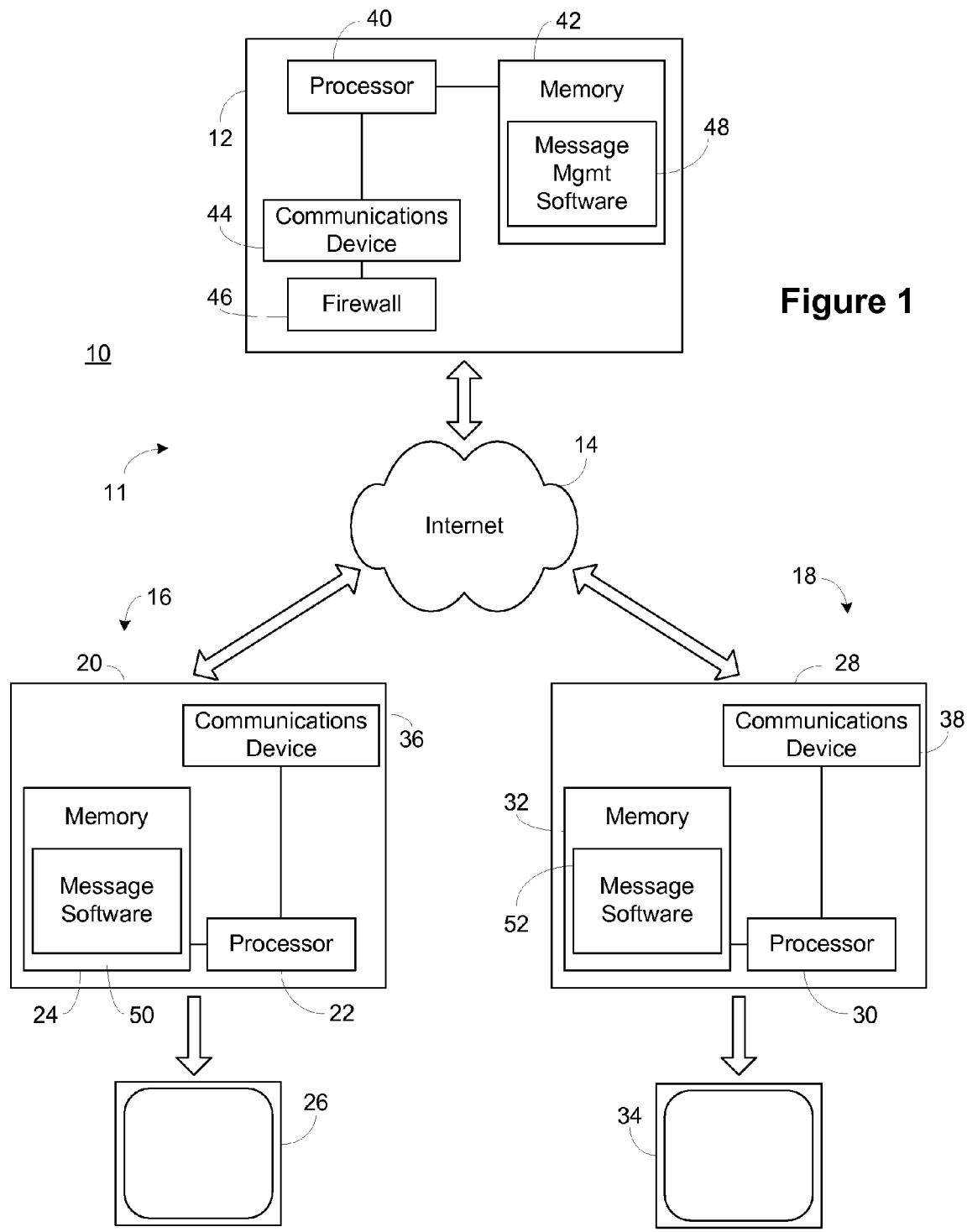
FIG. 1 is a block diagram of an internet-based messaging system in accordance the present invention.

Referring to FIG. 1, there is shown a computer-based network 10 that incorporates a messaging system, and in particular an instant messaging system, illustratively identified as 11. Messaging system 11 includes a central server 12, which may be configured as a network server that performs a number of tasks or applications in addition to managing messages. Illustratively, server 12 may form a part of a server-based application network, where remote users of the network can utilize the software applications residing on the network in a manner that appears to the user that the application is running of their own computer. The messaging capability of server 12 allows two or more individual users to send and receive messages to and from one another in approximation of real time. Server 12 is shown illustratively as utilizing the internet, identified as element 14 in FIG. 1, as its communications link. FIG. 1 illustratively shows individual users 16 and 18, although it is understood that many users can be associated with messaging system 11 at any given time. Individual user 16 is shown as comprising a computer 20 incorporating a processor 22 and memory 24, which may comprise one or more types of computer memory, such as hard disc memory, RAM, or solid state memory. User 16 also comprises a display 26, which may be of a variety of types, including, but not limited to, cathode ray tubes or liquid crystal displays. Individual user 18 is shown a comprising a computer 28 having a processor 30 and memory 32, such as that used in computer 20, and a display 34. Computers 20 and 28 may comprise a variety of devices having the necessary processing and communication functionality, such as desk-top PCs, laptop computers, internet-capable cell phones, and personal information managers (PIMs), for example. User 16 communicates via the internet by way of communications means 36, which may be any type of communications device, including wired or wireless devices, such as cable modems or telephonic modems, for example.

Likewise, user 18 communicates through the internet using communications means 38, which may also be a variety of different communications devices. FIG. 1 illustrates server 12 as managing the messaging system of the present invention, but peer to peer messaging systems are also available and the present invention is equally adaptable to peer to peer systems and server-based messaging systems. Server 12 includes a processor 40, memory 42, and a communications device 44 operating through a firewall 46. Server 12 may also include other components and elements unrelated to the management of a messaging system, but which may be used with such system as described below, such as word processing and database management, for example.

As part of the implementation of the messaging capability of the network shown in FIG. 1, central server 12 also incorporates message management software 48 illustratively shown as residing in memory 42. In a similar fashion, computer 20 of user 16 also comprises a messaging software application 50 which resides in memory 24, which computer 28 includes messaging software 52 residing in memory 32. Messaging software 50 and 52 is designed to be compatible and work with message management software 48 of server 12.

In operation, server 12 operates in a "stateless" manner, with connection being made to individual user computers on a request basis. Known messaging systems operate with the user's messaging software application keeping an open communication socket open to the server at all times that the application is running. Even though message may include the recipient's email address, the message will be sent to server 12 for routing. Maintaining a continually open socket utilizes server resources in an inefficient and wasteful manner. The messaging system 11 of the present invention, on the other hand, operates using a message polling technique, where the users' messaging software application, such as software 50 or 52, polls or "calls" the server 12 to determine if message intended for that user are waiting to be delivered. As stated above, this is different from standard messengers where the application keeps an open socket connection to the sever. The implementation of the present invention is more scalable than a "connected" system, since a "stateful" connection is not continually kept and more users can be accommodated and services with the same overall resources.

In an aspect of the present invention, messaging system 11 utilizes intelligent dynamic polling, where the polling schedule, i.e., the intervals between requests to the server for messages, is adjustable within a configurable range. This dynamic polling may be based on a variety of different "rules." One form of dynamic polling is based on the current level of message activity. Using user 16 as an example, software application 50 polls server 12 more often if there is current messaging activity. If there is no messaging activity, however, software 50 polls server 12 less often. The delay between polling server 12 is increased if no messages are waiting when polling takes place. For example, server 12 may be initially polled after 30 seconds. This poll time is increased by 10 seconds until a maximum polling interval, e.g., 90 seconds, is reached. If no messages are waiting or available after 30 seconds then the next poll will occur after 40 seconds, then 50 seconds, up to the maximum interval. If a message is received at any polling occurrence, the delay to the next poll of the server will be reset to 30 seconds.

A second form of dynamic polling is based on statistics derived from historical activity. A user's messaging activity is recorded over time, and statistical summaries are made and used to adjust the polling schedule or intervals in accordance with a user's predicted activity. For example, if user 18 is most active daily from 8:00 am to 9:00 am then user's software 52 will poll sever 12 more often during this time and less often outside this time. Additionally, when server 12 is polled by any user, any new messages waiting at the server for that user are returned in the response to the poll. This saves the server from being polled for individual messages. The software 50 and 52 can perform the functions of storing, reviewing, recording, analyzing, regulating, predicting, determining and adjusting with respect to the polling schedule and the data associated therewith.

In accordance with other aspects of the present invention, software 50 and 52 will not poll server 12 when the respective users' screen saver is running or the user has "locked" the computer, e.g., implemented a password-protected state. The message server is not polled if the user is not logged on to the system.

Individual users can also create a schedule of when to poll for new messages. This allows server 12 to be polled only during the times and days of the week selected by the user, which permits a user to configure message software applications to run on different computers (e.g. home and office) without conflicts, as each computer will only get messages sent within scheduled polling intervals assigned to that particular computer.

Although server 12 operates in a stateless manner, it is of course possible to implement a peer to peer messaging system that maintains open communication sockets between users. Based on user activity, messaging system 11 could implement whichever connection was best suited to the current activity of the users, with such decision being made by either server 12 or the application, e.g., software 50 or 52, residing on the users' computer.

The present invention also contemplates the implementation of application-to-application messaging such as, for example: sending meeting requests from PIM to PIM (e.g., in iCal format) and receiving replies. The message recipient can view the request and either accept or decline the meeting. Alternatively, automatic scheduling of meetings and events among many users may also be accomplished in this manner, as the messaging software residing on each PIM can interface with calendar and scheduling software to determine available times and dates, and coordinate with each of the other addressed PIMs to set a meeting date and time. Application-to-Application messaging also permits the implementation of a "remote clipboard" function which allows the messaging application software to copy data from one computer and paste it to the Windows Clipboard on another computer, so a user on that other computer can paste the data from their clipboard into another application running on that computer.

In accordance with another aspect of the present invention, messaging software applications 50 and 52 may permit a user to select who can see whether they are online or offline, i.e. a user's "presence." With this feature implemented, those users who want to see this user's presence must submit a request to the user. The user can either accept the other user's request, meaning that the other user will receive presence information from this user, or decline the other user's request, meaning that the other user will not receive presence information from this user. If a user accepts the request, the requested is notified directly whenever the user goes online or offline.

Any user who has not requested another user's presence, or has been denied a request, will always recognize that other user as being offline. A user can also block their online presence on a user-by-user basis. For example, a user may want to block their presence information from being sent to one requester but still send their presence information to other requesters.

Other features of the messaging system of the present invention may include the ability of the messaging software application to autorespond when a user is not available, the ability to organize users by groups and send messages to a group, block messages from particular users, the ability to save a message thread on server 12 in order to retrieve the thread at a different time or from a different computer, validating a user's email address when adding that user to a contact list to prevent adding users who are not supported by valid addresses, the ability to migrate the messaging system across various operating system platforms, e.g., Microsoft Windows, Linux, Apple, the ability to interoperate with other messaging protocols, such as ICQ, AOL Instant Messenger, MSN Messenger, for example.

Messaging system 11 can also aid in the implementation of an anti-spam control by establishing a minimum time that can occur between messages. Messages that arrive in rapid sequence with a message-to-message interval less than the established or selected minimum time could be ignored, deleted, or automatically moved to a lower priority folder.

While the present invention has been illustrated in the drawing and described in detail in the foregoing description, it is understood that such illustration and description are illustrative in nature and are not to be considered restrictive, it being understood that only the preferred embodiments have been shown and described and that all changes and modifications that would be apparent or would occur to one skilled in the art are to be protected.

What is claimed is:

1. A messaging system comprising:
a message server for storing messages intended for at least one user;
a computer for periodically polling said message server to determine if any messages are present for said at least one user; and
a polling scheduler for determining a computer polling period of when said computer should poll said message server, said polling scheduler comprising:
storage for reviewing said at least one user's messaging activity over time;
an analyzer for developing statistics from said reviewed messaging activity; and
a regulator for using said statistics to develop said at least one user's predicted messaging activity in order to adjust said computer polling period based on said predicted messaging activity.

2. The messaging system of claim 1, wherein said computer polling period is decreased during intervals of increased messaging activity and increased during intervals of decreased messaging activity.

3. The messaging system of claim 1, wherein said computer polling period is decreased during intervals related to first particular times of day and increased during intervals related to second particular times of day.

4. The messaging system of claim 1, wherein said polling scheduler comprises a portion of said computer.

5. A messaging system comprising:
a message server for storing messages intended for at least one user;
a computer for periodically polling said message server to determine if any messages are present for said at least one user; and
poll scheduling software for determining a computer polling period of when said computer should poll said message server, said poll scheduling software comprising:
a tabulator for recording said at least one user's messaging activity over time;
an analyzer for developing statistics in response to said recorded messaging activity; and
a regulator using said statistics to develop said at least one user's predicted messaging activity in order to adjust said computer polling period based on said predicted messaging activity.

6. The messaging system of claim 5, wherein said computer polling period is decreased during intervals of increased messaging activity and increased during intervals of decreased messaging activity.

7. The messaging system of claim 5, wherein said computer polling period is decreased during intervals related to first particular times of day and increased during intervals related to second particular times of day.

8. The messaging system of claim 5, wherein said poll scheduling software is resident in said computer.

9. A method for retrieving messages for at least one user, said messages being stored on a message server and being retrieved to a computer, comprising the steps of:
periodically polling said message server by said computer to determine if any messages are present for said at least one user; and
developing a polling schedule to determine when said computer should poll said message server, comprising the steps of:
recording said at least one user's messaging activity over time;
developing statistics from said recorded messaging activity; and
using said statistics to develop predicted messaging activity for said at least one user and for determining said polling schedule based on said predicted messaging activity.

10. The method of claim 9, wherein said polling schedule is decreased during intervals of increased activity and increased during intervals of decreased activity.

11. The method of claim 9, wherein said polling schedule is decreased during intervals associated with first particular times of day and increased during intervals associated with second particular times of day.

12. The method of claim 9, wherein said steps of developing the polling schedule are performed on said computer.

13. A messaging system comprising:
a network;
a message server coupled to said network and storing messages intended for at least one user; and
a computer coupled to said network for communicating with said message server and for periodically polling said message server for determining if any messages are present for said at least one user, said computer incorporating a polling schedule developer to determine when said computer should poll said message server, said polling schedule developer comprising:
a recorder for recording said at least one user's messaging activity over time;
a statistical developer for developing statistics from said recorded messaging activity; and
a processor for using said statistics to develop said at least one user's predicted messaging activity and for adjusting said polling schedule based on said predicted messaging activity.

14. The messaging system of claim 13, wherein said polling schedule is decreased during intervals of increased messaging activity and increased during intervals of decreased messaging activity.

15. The messaging system of claim 13, wherein said polling schedule is decreased during intervals related to first particular times of day and increased during intervals of second particular times of day.

16. A messaging system comprising:
a network;
a message server coupled to said network and storing messages intended for at least one user; and
a computer coupled to said network for communicating with said message server and for periodically polling said message server to determine if any messages are present for said at least one user, said computer incorporating poll scheduling software for determining a polling schedule of when said computer should poll said message server, said poll scheduling software comprising:
a recorder for recording the messaging activity over time of said at least one user;
a statistical developer for developing statistics from said recorded messaging activity; and
a processor for using said statistics to develop said at least one user's predicted messaging activity and for adjusting said polling schedule based on said predicted messaging activity.

17. The messaging system of claim 16, wherein said polling schedule is decreased during intervals of increased activity and increased during intervals of decreased activity.

18. The messaging system of claim 16, wherein said polling schedule is decreased during intervals related to first particular times of day and increased during intervals related to second particular times of day.

19. A method for retrieving messages for at least one user, said messages being stored on a message server and being retrieved to a computer, said message server and said computer communicating over a network, comprising the steps of:

periodically polling said message server by said computer to determine if any messages are present for said at least one user; and developing a polling schedule to determine when said computer should poll said message server, comprising the steps of:

recording said at least one user's messaging activity over time;

developing statistics from said recorded messaging activity; and using said statistics to develop predicted messaging activity for said at least one user and for determining said polling schedule based on said predicted messaging activity.

20. The method of claim 19, wherein said polling schedule is decreased during intervals of increased activity and increased during intervals of decreased activity.

21. The method of claim 19, wherein said polling schedule is decreased during intervals related to first particular times of day and increased during intervals of second particular times of day.

* * * * *